United States Patent [19]
Ober et al.

[11] Patent Number: 4,692,188
[45] Date of Patent: Sep. 8, 1987

[54] PREPARATION OF INK JET COMPOSITIONS

[75] Inventors: Christopher K. Ober, Oakville; Randolph E. Branston, Sarnia, both of Canada

[73] Assignee: Xerox Corporation, Stamford, Conn.

[21] Appl. No.: 787,594

[22] Filed: Oct. 15, 1985

[51] Int. Cl.$^4$ .................. B01J 13/02; C09D 11/00; C09D 11/10
[52] U.S. Cl. .................. 106/23; 260/DIG. 38; 427/213.36
[58] Field of Search .................. 264/4.6; 106/23; 427/213.36; 260/DIG. 38

[56] References Cited

U.S. PATENT DOCUMENTS

| | | | |
|---|---|---|---|
| 2,374,602 | 4/1945 | Kienle et al. | 260/29 |
| 3,016,308 | 1/1962 | Macaulay | 264/4.6 X |
| 3,660,304 | 5/1972 | Matsukawa | 264/4.6 |
| 3,784,391 | 1/1974 | Kruse et al. | 106/170 |
| 4,248,636 | 2/1981 | Sasaki et al. | 106/23 |
| 4,340,519 | 7/1982 | Kotera et al. | 523/414 |
| 4,471,079 | 9/1984 | Enami | 523/161 |

FOREIGN PATENT DOCUMENTS

| | | |
|---|---|---|
| 0030772 | 2/1980 | Japan . |
| 0157668 | 12/1980 | Japan . |
| 547059 | 8/1941 | United Kingdom . |
| 2046770A | 11/1980 | United Kingdom . |
| 2116193A | 9/1983 | United Kingdom . |

Primary Examiner—Richard D. Lovering
Attorney, Agent, or Firm—E. O. Palazzo

[57] ABSTRACT

Disclosed is a process for the preparation of ink compositions useful for jet printing processes which comprises (1) dissolving in water immiscible organic solvent a polymer composition and an organic oil soluble dye; (2) adding an aqueous phase water surfactant mixture thereto; (3) affecting emulsification thereof; and (4) subsequently evaporating from the aforementioned mixture the solvent thereby resulting in an ink with the dye trapped in the polymer particles suspended in the aqueous phase.

22 Claims, No Drawings

PREPARATION OF INK JET COMPOSITIONS

BACKGROUND OF THE INVENTION

The present invention is generally directed to processes for ink compositions; and more specifically the present invention is directed to improved processes for formulating ink compositions useful in ink jet printing apparatuses especially those commercially available such as, for example, the Diablo C-150. Accordingly, in one embodiment of the present invention there is provided a process for ink compositions wherein an oil soluble dye is entrained or trapped in a polymer matrix by affecting the dissolution of a polymer and a dye in a solvent phase; dispersing the mixture formulated in water; permitting the formation of an oil phase, and a water phase; and thereafter removing the solvent thereby enabling discrete dye polymer particles in water. The aforementioned particles when jetted onto a paper substrate possess improved waterfastness, and a decrease in feathering or wicking of the ink composition. Also, these discrete particle compositions which can be stabilized by various surfactants are very useful as marking particles in known ink jet printing processes.

Compositions, especially those with water soluble dyes, for ink jet printing processes are well known. There is thus disclosed, for example in U.S. Pat. No. 3,846,141, an ink jet printing composition comprised of an aqueous solution of a water-soluble dye and a humectant material formed from a mixture of a lower alkoxy triglycol, and at least one other compound selected from the group consisting of a polyethylene glycol, a lower alkyl ether of diethylene glycol, and glycerol. According to the disclosure of this patent, the printing inks illustrated are of a viscosity that is subjected to little variation with use as water is lost by evaporation during recirculation of the ink composition through the jet printer. Moreover, apparently the humectant system disclosed in this patent substantially prevents or minimizes tip drying of the printing ink in the orifice or nozzle during down time of the printer, such as when the printer is rendered inoperative. Also, it is indicated in this patent that the basic imaging technique in jet printing involves the use of one or more ink jet assemblies connected at a pressurized source of ink. Each individual ink jet includes a very small orifice, usually of a diameter of 0.0024 inches, through which is propelled the ink by a magneto restrictive piezoelectric means resulting in a continuous stream of uniform droplets of ink at a rate of 33 to 75 kilohertz. This stream of droplets is desirably directed onto the surface of a moving web of, for example paper; and is controlled to form printed characters in response to video signals derived from an electronic character generator, and in response to an electrostatic deflection system.

Also, there are disclosed in U.S. Pat. No. 4,279,653 ink jet compositions with water-soluble wetting gents, a water-soluble dye and an oxygen absorber. Similarly, U.S. Pat. No. 4,196,007 describes an ink jet printing composition consisting of an aqueous solution of a water-soluble dye and a humectant with at least one water-soluble unsaturated compound. Other prior are disclosing aqueous inks for ink jet printing, and processes of the preparation thereof are U.S. Pat. Nos. 4,101,329; 4,290,072 and 4,299,630.

Ink jet compositions can be prepared by a number of known methods. Generally, these methods involve dissolving the various dyes, humectants, viscosity control agents, paper fixing additives, surface tension control additives, biocides and anti-oxidants in a known volume of water, followed by adjusting the pH and concentration of the solution to desirable levels. In those situations wherein the dyes selected are not water-soluble, the inks are prepared by standard known milling processes. However, the dye dispersions are generally not sufficiently stable, and accordingly when incorporated into a printing machine, the ink particles tend to agglomerate resulting in the clogging of the small nozzles present in the ink jet devices. One of the important objectives of the present invention resides in the preparation of stabilized discrete particles of a uniform, less than 0.5 microns, average diameter, for example, thus preventing the undesirable agglomeration of these particles.

Moreover, processes for dispersing liquids by the use of ultrasonic vibrations is generally known. For example, there is described in U.S. Pat. No. 3,361,680 processes for dispersing one liquid into another by the use of ultrasonic vibrations. More specifically, there is disclosed in this patent a process for dispersing one liquid into a second liquid immiscible therewith by subjecting the mixture to ultrasonic vibrations wherein there is added to the first liquid an inert liquid, followed by heating the mixture. According to the teachings of this patent, one advantage of using ultrasonic vibrations is to obtain smaller size dispersed phase particles, that is, more stable dispersions.

Additionally, polymer particles can be prepared by known suspension polymerization and emulsion polymerization processes. In suspension polymerization, there is selected a monomer-soluble free radical initiator dissolved in a large size, approaching 40 to 300 microns in diameter, dispersion droplet with stabilization or the dispersion being accomplished with a dispersant or suspending agent other than a surfactant. With emulsion polymerization, water-soluble initiators and surfactants are used for the purpose of stabilizing the polymerized monomer dispersions. In contrast, in microsuspension polymerization; and particularly, with the preparation of polymer microlatices, there are selected surfactants, monomer-soluble initiators, and a water-soluble free radical inhibitors. Polymer particles of the desired size are formed by subjecting the mixture of water, monomer and surfactant to intense shear whereby the results monomer droplets of a size corresponding to that of the polymer desired. Specifically, with microsuspension polymerization, a monomer, a dissolved initiator, and water containing a specific emulsifier are homogenized in a colloid mill into very small droplets of a diameter of from 0.2 to 1.0 microns prior to polymerization. Subsequently, these droplets are polymerized enabling polymer particles with a diameter of from about 0.4 to 2 microns. Also, microsuspension, polymerization can be selected for the preparation of polyvinyl chloride resins suitable for conversion to plastisols.

Also, there is illustrated in U.S. Ser. No. 722,100, now U.S. Pat. No. 4,652,508 entitled Toner Composition and Dispersion Polymerization Process, the disclosure of which is totally incorporated herein by reference, a process for the preparation of particles for ink jet printing which comprises (1) providing a monomer having dissoled therein oil-soluble dyes; (2) mixing with the resulting monomer particles polymer initiator substances; (3) mechanically agitating the resulting solution; (4) subsequently adding thereto a solution of water and surfactant agents; (5) subjecting the resulting solution to ultrasound vibrations, followed by heating at a polymerization temperature of from about 50° C. to about 100° C., resulting in polymer particles of a diameter of from about 0.03 microns to about 2.0 microns and containing therein oil-soluble dyes, stabilized by surfactant. With the process of the present invention, there is no polymer formation as a preformed polymer is selected for particle fabrication. Further, the dyes utilized for the process of the present invention as they retain their color characteristics are not subjected to adverse oxidation reactions by the free radical initiator. In contrast with the dyes used, for example in microsuspension polymerizations, changes in the dye color can easily result.

There is also disclosed in U.S. Pat. No. 4,246,154 a process for permitting the formulation of ink jet compositions from vinyl polymer latices by a dye imbibition technique. The aforementioned anionically stabilized latices, which are obtained by emulsion polymerization, are colored with a dye imbibition process. Coloring processes, as illustrated in Konishiroku EP Publication 0.068,9003 and DE No. 3,233,555, are similar to the ink jet procedures of the '154 patent with the exception that there is used in the latter a performed polyurethane latex. In contrast to the prior art teachings, the process of the present ivnention enables a process that generates polymer solution droplets with a dye present during the emulsification step with subsequent particle formation resulting during solvent removal, a one step process, rather than the two steps of the prior art.

While the above compositions and process are suitable for their intended purposes, there continues to be a need for new jet ink processes. Additionally, there continues to be a need for improved processes for ink jet compositions with superior optical print densities, excellent waterfastness characteristics, and reduced wicking properties. Moreover, there continues to be a need for methods of obtaining ink jet compositions wherein the oil soluble dye selected is entrained or trapped in a polymeric composition. Further, there is a need for methods of preparing ink jet compositions which are waterfast, have an excellent affinity for paper substrates and superior drying times. Also, in accordance with the present invention there are provided methods of preparation wherein the resulting inks contain therein oil soluble dyes situated in the interior of the ink particles, thus enabling the dye to be chemically protected, and further preventing the dyes from effecting the surface tension of the particles involved. Additionally, when these compositions with colloidal characteristics impinge the paper substrate during jet printing there is immediately precipitated on the fibers ink particles. Accordingly, these particles separate from the colorless suspending fluid rather than undesirably penetrating into the paper. With penetration there occurs the known problem of showthrough, feathering, or chromatographic separation of the dye components of soluble inks. Further, it is difficult to prepare waterfast images from water-soluble dyes since the ink jet compositions are complex as they contain additives (1) to prevent oxidation thereof; (2) for fixing and for controlling viscosity of the liquid ink particles; and (3) for controlling the evaporation rate and biological activities thereof. Also, with the processes of the present invention there result ink jet compositions with reduced bleeding characteristics, and particles of a size diameter of, for from example, 0.1 to 0.5 microns. Further, a variety of usable polymers, and dye combinations can be used in the process of the present invention since a dye imbibition step is absent.

SUMMARY OF THE INVENTION

It is an object of the present invention to provide processes for preparing ink jet compositions which overcome some of the above-noted disadvantages.

In a further object of the present invention there are provided processes for the preparation of ink compositions comprised of a polymer composition with dyes entrained therein.

An additional object of the present invention resides in the provision of methods for obtaining ink particles of effective sizes.

Another important object of the present invention resides in ink processes wherein discrete individual particles of a diameter of 0.1 microns are obtained.

In still another object of the present invention there are provided processes for generating ink jet compositions that have improved water-fastness characteristics and reduced wicking properties.

Also, in accordance with another object of the present invention there is provided a single process useful for the preparation of cyan, magenta, yellow, and black inks from substances with widely different chemical properties.

These and other objects of the present invention are accomplished by the provision of processes for obtaining ink jet compositions comprised of polymers with dyes entrained therein. More specifically, in one embodiment, the present invention is directed to processes for ink compositions which comprise (1) dissolving in a water immiscible organic solvent a polymer composition and an oil soluble dye; (2) adding thereto a solution of water and surfactant wherein there is formed an aqueous phase of water and surfactant, and an oil phase of organic solvent, polymer, and dye; (3) emulsifying the mixture resulting; and (4) thereafter evaporating the organic solvent thereby permitting suspending in the aqueous phase the polymer with dye entrained therein. The excellent color properties of the product particles, and the absence of dye crystals in the aqueous phase indicate that the dye is entrained or trapped in the polymer. Also, the dyes which are insoluble in the aqueous phase and have similar solubility properties to the polymer phase are attracted to the polymer phase during removal of the organic solvent. These dyes are present in the final ink particle in an amount of from 1 to about 50 percent by weight of the polymer.

In one specific embodiment of the process of the present invention comprises (1) dissolving by mixing for a period of from about 10 minutes to about 60 minutes in a water immiscible halogenated organic solvent a polymer composition selected from the group consisting of polystyrene, polyesters, polycarbonates, polymethacrylates, and copolymers thereof; and an oil soluble dye selected from the group consisting of Oil Pink 312, Neozapon 807, Sudan Black B, and Oil Yellow; (2) adding thereto a solution of water and surfactant selected from the group consisting of sodium dodecyl sulfate, lauryl pyridinium chloride, and sodium dilauryl sulfosuccinate, wherein there is formed an aqueous phase of water and surfactant, and an oil phase of halogenated organic solvent, polymer and dye; (3) emulsifying the mixture resulting for a period of from about 0.5 minutes to about 30 minutes with an ultrasonic apparatus; and (4) thereafter evaporating the halogenated organic solvent by heating the mixture to a temperature of from about 20° to about 100° C. thereby permitting suspended in the aqueous surfactant phase an ink comprised of the polymer with dye entrained therein. Evaporation is usually accomplished in a period of from about 20 minutes to about 15 hours, however, shorter times can be involved especially when a vacuum is applied. There results solid ink polymer particulates of a diameter of from about 0.3 micron to about 2.0 microns present in an amount of from about 5 percent by weight to about 50 percent by weight dispersed in an aqueous medium. Specifically, in the ink composition comprised of the polymer particulate particles are formulated with a dye present in an amount of from about 1 percent to about 50 percent by weight of the total polymer particulate fraction, and the remainder, from about 50 percent by weight to about 95 percent by weight of water. Additionally, the inks may be formed by the evaporation of the aqueous phase, or by the centrifugation of the particulates, followed by their redispersion in a smaller amount of liquid. Low molecular weight polymers, or other additives such as ethylene glycols or salts which function as a humectant, as well as other additives inclusive of bacteriastats of fungicides which may be ionic in nature can be added to the final ink formulations.

Polymeric compositions that may be selected for the process of the present invention include the polymers of vinyl monomeric substances such as styrene, parachloro styrene, vinyl naphthalene unsaturated mono olefins such as ethylene, propylene, butylene, and isobutylene; vinyl halides like vinylchloride, vinylbromide, vinylfluoride, vinylacetate, vinylbenzoate, and vinylbutyrate; vinyl esters such as esters of monocarboxylic acids, including methylacrylate, ethylacrylate, n-butylacrylate, isobutylacrylate, dodecylacrylate, n-octylacrylate, 2-chloroethylacrylate, phenylacrylate, methylmethacrylate, ethylmethacrylate, and butylmethacrylate; acrylonitrile; vinylhexyl ketone, and methylisopropyl ketone; vinylidene halides inclusive of vinylidene chloride, vinylidene chlorofluoride, and the like; polyesters; polycarbonates; and mixtures thereof. Other polymers may be suitable for use in the process of the present invention providing they permit the objectives of the present invention to be affected. Particularly preferred are polycarbonates, such as Lexan, polystyrene, including the copolymers thereof; polymethacrylates, and the copolymers thereof; and polyesters, such as poly(ethylene succinate).

From about 5 percent by weight to about 50 percent by weight, and preferably from about 10 percent by weight to about 25 percent by weight of polymer are selected for the process of the present invention. Accordingly, the resulting ink compositions contain from about 5 percent by weight to about 50 percent by weight of a polymer, and preferably from about 10 percent by weight to about 25 percent by weight of a polymer.

Illustrative examples of oil-soluble dyes selected for the process of the present invention are Sudan Black, commercially available from Fisher, Inc.; Sudan I, and nigrosine commercially available from Aldrich Chemical; Sudan II commercially available from Aldrich Chemical; and other classes of dyes such as Yellow Dyes commercially available from Pylam, Inc.; Neozapan Red GE available from BASF Chemical Company; Oil Blue A dyes commercially available from E. I. DuPont; Methyl Violet 1 B commercially available from Aldrich Chemical; Sudan Red BB commercially available from BASF Chemical Company; Sudan Orange G; Oil Red O; para-phenylazophenol; Rose Bengal, and 4',5'-dibromofluoroscein, all commercially available from Aldrich Chemical; Sudan Red 7B; Sudan Black B; Sudan Yellow 146; Neozapan Blue; Oracet Yellow GN, available from Ciba-Geigy; BASF Sudan Yellow 150; BASF Sudan Red 7B; Oil Yellow; Bayer Ceres Red 3R; Orient Chemical Ind., Ltd.; Oil Pink 312; Pylam Pylakrome Pink LX 1900; Bayer Ceres Blue R; BASF Neozapan 807; BASF Sudan Deep Black; Bayer Ceres Black BN; and the like. These dyes impart the desired color to the ink particles, thus for example, the Oil Pink 312 results in particles with a magenta color; and Neozapan 807 provides cyan ink particles.

Also, the oil-soluble dyes are entrained in the polymer in an amount of from about 1 to 50, and preferably from about 5 percent by weight to about 25 percent by weight. More preferably, the dyes are present in an amount of from about 10 percent by weight to about 15 percent by weight of polymer. Entrainment is evidenced by, for example, the absence of both color and undissolved dye crystals in the aqueous phase of the highly colored inks. The polymer with dye is dissolved in an organic solvent resulting in an oil phase of solvent, dye, and polymer. From about 70 to 95 percent by weight of solvent is selected from the process of the present invention. Further, the spectral characteristics of the inks were equivalent to solutions of the same dyes dissolved in organic solvents, an indication that the color was a result of the dye trapped in the solid polymer phase. Examples of solvents include aliphatic and aromatic components, such as methylene chloride, 1,1,1-trichloroethane, heptane, benzene, toluene and cyclohexane.

Water, preferably distilled, in a major amount, for example from about 50 percent to about 95 percent by volume with from about 0.05 percent by weight to about 1.0 percent by weight of surfactant, is admixed with the polymer and dye composition for a sufficient period of time permitting a uniform mixture of the components. Generally, the time of mechanical mixing will vary depending on the components selected for the ink composition. However, in one aspect of the present invention this mixing time is from about 0.5 minutes to about 60 minutes, and preferably from about 2 minutes to about 20 minutes.

Illustrative examples of surfactants that may be selected for the process of the present invention are ionic, and non-ionic substances such as sodium laurate, sodium lauryl sulfate, sodium oleate, potassium oleate, polyoxyethylene tertiary octyl phenol, Pluronic F68, polyoxyethylene sorbitol monolaurate, sucrose, palmitate, potassium stearate, ammonium naphthenate, morpholine laurate, sulfated propyloleate sodium salts, sulfonated castor oil, sodium diaryl sulfosuccinate, sodium lignosulfonate, N-polyethoxystearylamine, dodecyltrimethylammonium chloride, methyl dodecylbenzyl trimethyl ammonium chloride, lauryl pyridinium chloride, and similar surfactants. These surfactants, of which the ionic substances are preferred, permit the preparation of discrete ink particles with substantially no agglomeration thereby rendering these particles highly useful for jet printing processes.

With further respect to the process of the present invention, desirable homogenization of the formed droplets is affected with an ultrasound device which emits effective frequencies causing the droplets to be sheared, and wherein there is obtained droplets of a diameter of from about 0.03 micron to about 2.0 microns, and preferably from about 0.1 micron to about 1.0 micron. Removal of the solvent from the droplets is then accomplished by, for example, evaporation at a temperature of from about 20° to about 100° C., and preferably at a temperature of from about 30° to about 50° C., thus resulting in the formation of the dye-polymer particles.

The ultrasound treatment and solvent removal is generally accomplished for a sufficient period so as to result in particles of a desired diameter, and also to affect complete solvent evaporation. In one preferred embodiment of the present invention, sonication is continued for a period of from about 0.5 minutes to about 30 minutes, and preferably for a period of from about 2.0 minutes to 10 minutes. Thereafter, solvent removal is affected in a period of from about 2 hours to about 15 hours. There thus results, contained in an aqueous solution, polymer particles of a diameter of from about 0.03 micron to about 2.0 microns having incorporated therein the oil-soluble dye, or mixtures thereof; and containing surfactant or surface active agents thereon. The water present serves as a vehicle for the polymer particles allowing such particles to be transported, for example, through ink jet nozzles onto a suitable substrate such as paper. In an optional process variation of the present invention, there is added to the reaction mixture prior to or subsequent to homogenization various glycols, such as ethylene glycol for the purpose of reducing the evaporation of water from the mixture during imaging. Biocides and surface active components may also be incorporated into the ink composition.

The particle sizes of the droplets, and the particle sizes of the materials prepared subsequent to solvent evaporation, can be determined by various known techniques; however, in accordance with the process of the present invention these sizes were obtained with Coulter Nano-sizer apparatuses, and measured with electron microscopy. Other properties associated with the ink compositions prepared in accordance with the process of the present invention include a surface tension of from about 30 dynes/cm to about 65 dynes/cm, and a viscosity of from about 1 to about 5 centipoise.

Accordingly, a final ink composition obtained in accordance with the process of the present invention is comprised of about 50 to about 95 percent by weight of water; and about 5 to about 50 percent by weight of polymer containing about 5 to about 25 percent by weight of dye therein. Surfactants can be included in the final ink in an amount of from about 0.05 to 1 percent by weight, and wherein the amount of water present is appropriately reduced resulting in a total percentage for all components, water, polymer with dye, and surfactant of 100 percent.

The ink compositions prepared in accordance with the process of the present invention exhibit excellent waterfastness, that is, they permanently adhere to the substrate surface in view of the trapping of the dye in the polymer. Moreover, the ink particles, in view of their diameters, were found to be very useful in ink jet printing systems since, for example, the ink jet nozzles directing the ink remain essentially open and unclogged, which is not the situation with many ink compositions of the prior art as the particles obtained are of larger diameters thereby resulting in clogging. Also, the size of the resulting particles specified hereinbefore enable them to penetrate the spaces between the fibers contained on the paper substrate allowing a desirable matte finish despite the apparent high loading of polymer composition. Further, undesirable bleeding and wicking does not result with the inks prepared in accordance with the process of the present invention. Additionally, inks with improved lightfastness and waterfastness can be obtained with the process of the present invention.

The following examples are being supplied to further define various species of the present invention, it being noted that these examples are intended to be illustrative only and are not intended to limit the scope of the present invention. Parts and percentages are by weight unless otherwise indicated.

EXAMPLE I

There was prepared an ink jet ink composition by dissolving 4.5 grams of a styrene-n-butylmethacrylate copolymer 58/42 and 1.5 grams of Sudan Black B dye in 50 milliliters of methylene chloride by stirring for 15 minutes. The black solution resulting was then filtered through glass wool into 200 milliliters of a 0.25 percent aqueous solution of sodium dodecyl sulfate surfactant and two phases formed, one an aqueous phase of water and surfactant; and an oil phase of copolymer, Sudan Black dye, and methylene chloride. Subsequently, the two phases were subject to sonification for 2.5 minutes with a W-375 sonicator set at an output of 4. Thereafter, the resulting emulsion was stirred for 16 hours at room temperature enabling the methylene chloride to evaporate. The initial ink resulting contained an aqueous phase with surfactant, and a solid polymer phase with copolymer and dye was then centrifuged at 13,000 rpm for 20 minutes, followed by the resuspension of the solid polymer particles with dye in 50 milliliters of the aqueous surfactant solution. The concentrated ink obtained was then sonified with the W-375 sonicator for 1 minute at a setting of 3 permitting the ink aggregates to be broken up into finer particles. After filtration through a #4 Whatman filter paper, there resulted in black ink composition comprised of copolymer with dye, solid contents of 12.7 percent by weight, dispersed in 0.25 percent of the aqueous sodium dodecyl sulfate solution. The solid contents were composed of 25 percent by weight of Sudan Black B dye and 75 percent by weight of styrene-n-butylmethacrylate copolymer. Also, solid polymer particles with dye in the resulting ink had an average particle diameter of 205 nanometers, a surface tension of 35 dyens/cm, and a viscosity of 2.0 centipoise. The waterfastness of this ink comprised of 87.3 percent by weight of water surfactant, and 12.7 percent by weight of polymer with dye, was 98.7 percent.

Other ink compositions were prepared with the characteristics as detailed in the following Table, including a magenta ink, by repeating the above procedure with the exception that there was selected 0.6 grams of Oil Pink 312 as the dye; and there resulted inks with substantially similar characteristics. There were also prepared cyan and yellow inks by repeating the above procedure with the exception that there was selected in place of the Sudan Black the dyes Neozapan 807 and Oil Yellow, respectively.

TABLE

| Color | D (nanometer) | Lambda$_{MAX}$ (nanometer) | OD$_{MAX}$* | % Solids (Polymer and Dye) | % Dye in Polymer Particle |
|---|---|---|---|---|---|
| Black | 205 | 400–800 | 1.05 | 18.1 | 25 |
| Cyan | 236 | 672, 608 | 0.97 | 18.1 | 26 |
| Magenta | 220 | 554 | 0.85 | 12.1 | 11 |
| Yellow | 238 | 350 | 1.03 | 17.8 | 25 |

*The paper was polyethylene-sized, 4024 base with 10 percent silica, which was jetted with a Diablo C-150 printer. OD is optical density of the printer inks. D represents average particle diameter of copolymer with dye.

EXAMPLE II

A cyan ink composition was prepared by repeating the procedure of Example I with the exception that there was selected 4 grams of a bisphenol A polycarbonate available from Polyscience in place of the styrene copolymer; and 2 grams of Neozapon 807, a cyan dye, in place of the Sudan Black. Also, for the first filtration there was used dilauryl sulfosuccinate instead of the sodium dodecyl sulfate. Further, the resulting particles were suspended in 20 milliliters of an aqueous solution of 1 percent Pluronic F68 prior to sonification for 1 minute at a setting of 2. The resulting ink contained 22 percent by weight solids in 0.25 percent aqueous dilauryl sulfosuccinate solution. Average particle size diameter was 190 nanometers with a composition of 32 percent by weight of Neozapan 807 bisphenol A polycarbonate. Other physical properties were substantially similar to those of the inks of Example I. Further, when this ink was jetted onto 4024 paper with a Diablo C-150 printer, the resulting images had an optical density of 0.58.

EXAMPLE III

A yellow ink composition was prepared by repeating the procedure of Example I with the exception that there was selected 4 grams of polyvinyl stearate in place of the styrene copolymer; and 2 grams of Oil Yellow dye instead of the Sudan Black. Also, the sonicator was set at 1 for 1 minute. There results an ink with a solids content of 9 percent in a 0.25 percent aqueous sodium dodecyl sulfate solution, and the solid particles were comprised of 36 percent by weight Oil Yellow dye in 64 percent by weight of polyvinyl stearate. The optical density of this ink was, when jetted onto 4024 paper with a Diablo C-150 printer, 0.62.

Other modifications of the present invention may occur to those skilled in the art based upon a reading of the present disclosure, and these modifications are intended to be included within the scope of the present invention.

What is claimed is:

1. A process for the preparation of ink compositions useful for jet printing processes which comprises (1) dissolving in a water immiscible organic solvent a polymer composition and an organic oil soluble dye; (2) adding an aqueous phase water surfactant mixture thereto; (3) effecting emulsification thereof; and (4) subsequently evaporating from the aforementioned mixture the solvent thereby resulting in an ink having particles consisting of polymer and entrained or entrapped dye suspended in the aqueous phase.

2. A process in accordance with claim 1 wherein there results ink particles with a diameter of about 0.3 to 1 micron.

3. A process in accordance with claim 1 wherein the organic solvent is selected from the group consisting of aliphatic and aromatic components.

4. A process in accordance with claim 1 wherein the organic solvent is an aliphatic halogenated solvent.

5. A process in accordance with claim 4 wherein the solvent is methylene chloride.

6. A process in accordance with claim 1 wherein the polymer is selected from the group consisting of polystyrenes, polyesters, polycarbonates and polymethyl methacrylates.

7. A process in accordance with claim 6 wherein the polystyrene is a styrene methacrylate copolymer.

8. A process in accordance with claim 6 wherein the polymer is poly(methyl methacrylate).

9. A process in accordance with claim 6 wherein the polyester is poly(ethylene succinate).

10. A process in accordance with claim 1 wherein the oil-soluble dye is selected from the group consisting of Oil Pink 312, Pylakrome Pink LX 1900, Oil Yellow, Oil Yellow 105, Savinyl Blue GLS, Oil Blue BOS, Neozapon 807, Sudan Black, and Sudan Black B.

11. A process in accordance with claim 1 wherein distilled water is selected for the aqueous phase.

12. A process in accordance with claim 1 wherein emulsification is affected by ultrasound.

13. A process in accordance with claim 1 wherein the solvent is evaporated by heating the mixture to from about 20° C. to about 100° C.

14. A process in accordance with claim 1 wherein the polymer is present in an amount of from about 5 percent to 50 percent by weight of the total ink.

15. A process in accordance with claim 14 wherein the dye is present in an amount of from about 5 percent to about 25 percent by weight of the polymer.

16. A process in accordance with claim 1 wherein the oil-soluble dye is selected from the group consisting of red, blue, yellow, cyan, magenta and black.

17. A process in accordance with claim 1 wherein emulsification is effected for a period of from about 0.5 to about 30 minutes.

18. A process in accordance with claim 1 wherein the water is present in an amount of from about 50 to about 95 percent.

19. A process in accordance with claim 1 wherein there result ink particles with a diameter of from about 0.03 micron to about 2.0 microns.

20. A process for the preparation of the compositions useful for jet printing processes consisting essentially of (1) dissolving in a water immiscible organic solvent a polymer composition and an organic oil soluble dye; (2) adding an aqueous phase water surfactant mixture thereto; (3) effecting emulsification thereof; and (4) subsequently evaporating from the aforementioned mixture the solvent thereby resulting in an ink having particles consisting of polymer and entrained or entrapped dye suspended in the aqueous phase.

21. A process in accordance with claim 20 wherein there result ink particles with a diameter of from about 0.3 to about 1 micron.

22. A process in accordance with claim 20 wherein there result ink particles with a diameter of from about 0.03 micron to about 2.0 microns.

* * * * *